United States Patent
Koukol, Jr. et al.

(10) Patent No.: US 7,003,417 B2
(45) Date of Patent: Feb. 21, 2006

(54) MULTIPLE CALIBRATION RANGES STORED IN A PROCESS TRANSMITTER

(75) Inventors: John L. Koukol, Jr., North Attleboro, MA (US); Peter E. Allstrom, Attleboro, MA (US)

(73) Assignee: Invensys Systems, Inc., Foxboro, MA (US)

( * ) Notice: Subject to any disclaimer, the term of this patent is extended or adjusted under 35 U.S.C. 154(b) by 0 days.

(21) Appl. No.: 10/456,430

(22) Filed: Jun. 6, 2003

(65) Prior Publication Data

US 2004/0249592 A1    Dec. 9, 2004

(51) Int. Cl.
G06F 19/00 (2006.01)
G01F 25/00 (2006.01)

(52) U.S. Cl. .......................... 702/88; 73/1.35; 702/104

(58) Field of Classification Search ............ 702/85–88, 702/101–102, 104; 73/1.34, 1.35, 29.02, 73/1.66, 1.88
See application file for complete search history.

(56) References Cited

U.S. PATENT DOCUMENTS

| | | |
|---|---|---|
| 2,503,052 A | 4/1950 | Keinath |
| 3,181,063 A | 4/1965 | Ullrich |
| 3,232,091 A | 2/1966 | Glassey |
| 3,440,533 A | 4/1969 | Earley |
| 3,720,813 A | 3/1973 | Badessa |
| 3,740,533 A | 6/1973 | Zeggelaar |
| 3,790,910 A | 2/1974 | McCormack |
| 4,569,221 A | 2/1986 | Snook, Jr. |
| 4,718,278 A | 1/1988 | Bergsma |
| 4,836,011 A | 6/1989 | Dombrowski et al. |
| RE34,070 E | 9/1992 | Regimand |
| 5,241,850 A | 9/1993 | Kawate |
| 5,519,644 A | 5/1996 | Benton |
| 5,553,481 A | 9/1996 | Arai |
| 5,710,370 A * | 1/1998 | Shanahan et al. ............ 73/1.35 |
| 5,911,238 A | 6/1999 | Bump et al. |
| 5,944,048 A | 8/1999 | Bump et al. |
| 5,975,126 A | 11/1999 | Bump et al. |
| 6,032,109 A | 2/2000 | Ritmiller, III |
| 6,073,480 A * | 6/2000 | Gokhfeld .................... 73/29.02 |
| 6,370,935 B1 * | 4/2002 | He et al. ...................... 73/1.34 |
| 6,587,803 B1 * | 7/2003 | Johansson ................... 702/104 |
| 2002/0078732 A1 | 6/2002 | Bentley |
| 2002/0091492 A1 | 7/2002 | Johansson |

OTHER PUBLICATIONS

"Resistive-Element Sensor Temperature Compensation" by Tony Allen, published in *Sensor*, Mar. 2002.
PCT Written Opinion Of The International Searching Authority, Oct. 28, 2004 (5 pgs.).

* cited by examiner

*Primary Examiner*—Bryan Bui
*Assistant Examiner*—John Le
(74) *Attorney, Agent, or Firm*—Leydig, Voit & Mayer, Ltd.

(57) ABSTRACT

Process variable transmitters, and method for calibrating such device, are disclosed that support calibrating, within a single transmitter device, multiple operating ranges such that a transmitter can switch from a first calibration correction definition associated with a first calibrated range, to a second calibration correction definition associated with a second calibrated range without having to perform a calibration procedure. Thus, rather than supporting only a single calibration definition, a calibration memory for the process variable transmitter comprises multiple calibration correction definition entries. Each calibration correction definition entry potentially expresses a correction relationship for one of multiple calibrated ranges represented in the calibration memory.

21 Claims, 8 Drawing Sheets

MULTIPLE CALIBRATION RANGES STORED IN A PROCESS TRANSMITTER

TECHNICAL FIELD

This invention relates generally to process control system transmitters, and, more particularly, to process variable transmitters that are utilized to transmit a process control variable value to a decision-making component of an industrial process control system.

BACKGROUND

Process variable transmitters are used in a variety of industrial applications, and provide an electrical output signal corresponding to a sensed condition signal generated by a process variable (e.g., temperature, pressure, pH, etc.) sensor. The electrical output signal of the sensor is translated into a corresponding measurement value for the particular detected environmental variable type. The corresponding measurement value, in turn, is converted into an output signal that is transmitted to a process controller. The process controller performs some action regarding the received output signal.

Typically, the correspondence between the electrical output generated by the transmitter and the measurement value, that is translated from the sensor's signal, is a well-defined, regular (e.g., linear) relationship governed by the range of measured values. For example, in a transmitter utilizing a 4–20 ma. current loop, a 4 milliamp output corresponds to a lowest value in a particular measured range (e.g., zero degrees Celsius) and a 20 milliamp output corresponds a highest value in a particular measured range (e.g., 100 degrees Celsius). Corresponding output signals for measured values in this range are then calculated based upon the relative positions of the measured values in the range. In the case of a linear output encoding scheme, 50 degrees Celsius (the midpoint in the range of 0 to 100 degrees) would result in an output of 12 ma. (the midpoint between 4 and 20 milliamps). In other cases, non-linear encoding schemes are use (e.g., logarithmic).

The relationship between an actual process variable value (e.g., temperature) and a sensor's output signal (e.g., an electrical current or voltage) is generally a non-linear, non-regular relationship. As a consequence the relationship is initially characterized, during manufacturing of the process variable transmitter, through application of known precise process variable inputs, observing the sensor output, and creating a characterization equation that reduces differences between the actual sensor input (e.g., fluid temperature) and the measured process variable value calculated from the sensor output signal. Characterization also linearizes the relationship between an output value and an input process variable.

Thereafter, a calibration correction equation is applied to the characterized calculated process variable values to further improve the accuracy of calculated process variable values over a particular range of process variable input values. Typical transmitter measurement calibrations are two-point calibrations that utilize accurately applied precise environmental variable values at two reference points to render a linear correction definition comprising an offset and slope. The linear correction definition adjusts for differences between actual process variable values and the characterized calculated values rendered by a applying a factory-established characterization equation. Applying the calibration-based linear correction to a characterized calculated measurement value generally renders a reduced error for calculated measured values within the range between the two calibration points—including a minimized error generally, though not necessarily, at the two calibration points. The two calibration sensor inputs are often chosen, by the party performing the calibration, to correspond to the end points of the intended operating range of the transmitter. In the above example, the two calibration points for a temperature transmitter would be at zero and 100 degrees Celsius—the two endpoints of the desired operating range of the temperature transmitter device.

The calibration process it not only time-consuming, but also resource intensive, as it requires applying physical process variable values very accurately to establish the reference measurements. The reference measurements are used to correct a measured signal value during operation of the process variable transmitter. While one of the measured values will be "zero" in many cases, for which a reference point can be established quite easily even without a precision process variable source (e.g., pressure and differential pressure transmitters), establishing a reference point for a second measured value (the other end of a calibrated range) can be a difficult process. As a consequence, recalibrating a process variable transmitter may be impossible in the field, or at least highly impractical, once the process transmitter is installed.

SUMMARY OF THE INVENTION

The present invention is directed to a process variable transmitter. Such devices have been used in industrial process control environments to sense a process variable state (e.g., a pressure, temperature, flow rate, material level, etc.). The process variable transmitter issues an electronic signal corresponding to the sensed process variable state. The process variable transmitter includes a process variable sensor. A processing unit within the process variable transmitter is configured to receive a value corresponding to a signal received from the process variable sensor. The processing unit also includes output value computation stages for rendering a calibrated output value based upon the received value. In particular the stages include a characterization computation stage (that applies a characterization equation to the input value). A calibration computation stage applies a calibration definition to the characterized input value. In accordance with the present invention, rather than supporting only a single calibration definition, a calibration memory comprises multiple calibration correction definition entries. Each calibration correction definition entry potentially expresses a correction relationship for one of multiple calibrated ranges represented in the calibration memory.

The present invention also comprises a method for configuring a process variable transmitter such that the transmitter is able to simultaneously support multiple calibrated ranges within the full range of readings supporting by the transmitter. Thus, the invention also comprises a method of enabling a process variable transmitter, of the type described above, to apply calibration-based corrections to calculated sensor measurements in the process variable transmitter. The transmitter includes a non-volatile memory configured to store multiple calibration-based correction definitions corresponding to sub-ranges within a full operating range of the process variable transmitter. The inventive method, in such a transmitter includes performing, for each of at least two calibrated ranges the following steps summarized below.

Initially, for each of the at least two calibrated ranges, the procedure includes taking sensor readings for at least two known process variable inputs corresponding to a calibrated range. Next, digital non-calibrated sensor reading values are generated for the two known process variable inputs. Thereafter, the procedure continues by applying values of the at least two known process variable inputs to the non-calibrated sensor reading values to render a calibration correction definition. Thereafter, the calibration correction definition is stored in an entry, corresponding to the calibrated range, of a calibration memory structure. The calibration memory structure supports simultaneously storing multiple calibration correction definitions associated with particular calibrated ranges. Thus, upon completion of the method, at least two calibrated range definitions are stored within the process variable transmitter.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE DRAWINGS

Before turning to the drawings, the following generally explains a number of the aspects of an exemplary process variable transmitter embodying the present invention. During operation, an uncalibrated measurement is calculated. Thereafter, a defined calibration correction is applied to render a calibration corrected measurement for the process variable. In an embodiment of the present invention, the process variable transmitter (e.g., temperature, pressure, pH, etc.) includes a non-volatile memory having multiple entries for storing calibration correction definitions over multiple calibration ranges within the full range of operation of the process variable transmitter. After calculating a calibration correction definition for a particular range, the calibration correction definition is stored within the non-volatile memory at an entry corresponding to the particular range. As a consequence, each time a new range is calibrated, rather than displace a previously stored calibration correction definition for a different range, a new calibration correction is stored in its own range-specific location.

The multiple calibration ranges facilitate calibrating a process variable transmitter at a number of ranges for the process variable transmitter and storing the calibration correction definitions during the manufacturing process. When the process variable transmitter is installed and operated, a user (or the transmitter processes automatically) is capable of choosing from any one of the pre-stored calibrated ranges based on the expected operating range of the installed process variable transmitter. In an embodiment of the invention, the process variable transmitter allows a user to adjust a calibration offset initially specified by a currently selected one of the multiple stored calibration correction definitions.

In an embodiment of the present invention, the process variable transmitter is a pressure transmitter. The pressure transmitter has sufficient computational power and memory space to quickly perform complex operations and to store multiple calibration correction definitions for multiple calibrated ranges. Typically, the pressure transmitter, using a pressure sensor, generates a sensed condition signal dependent on the pressure, and transmits an output current based on the signal. The relationship between the sensed condition signal and the applied pressure is a non-linear one, partially characterized/linearized by a high-order polynomial, interpolative lookup table or other mathematical correction. The electrical output of the pressure sensor is typically characterized/corrected during manufacture to significantly reduce the non-linearity of the relationship between the second condition signal and the applied pressure. Furthermore, temperature effects on the sensor are compensated.

In one implementation, multiple two-point calibrations are performed during manufacturing of a process variable (e.g., pressure) transmitter to reduce residual errors over particular operating ranges (expressed as a fraction of the upper range limit—or URL of the transmitter). By way of example, reference sensed condition signals are taken at known applied pressures corresponding to the transmitter's full range end points (0 and 100% of the URL), as well as at fractions of the full range (e.g., 50%, 20%, etc.). Two-point calibration correction definitions are generated based upon differences between the applied and calculated pressures for ranges specified by any two of the calibration measurements points. The calibration correction definitions are then stored as a set of table entries in non-volatile memory. The entries are accessed, for example, by range labels.

It is often desired to adjust the calibrated offset value after installing a transmitter. However, for pressure transmitters such offset adjustment (e.g., zeroing) is typically much easier than the two-point offset/slope calibration performed during the manufacturing process in an embodiment of the present invention. Embodiments of the invention permit a user to add their own calibration correction definitions to previously stored ones within the above mentioned non-volatile memory that maintains the multiple calibration correction definitions for various operating ranges of the process variable transmitter.

The calibration correction definitions stored in the non-volatile memory can take a variety of forms in accordance with various embodiments of the invention. In an embodiment of the invention, referred to as two-point calibration, each calibrated range correction definition includes offset and slope coefficients that define a linear correction equation. In other embodiments, a greater number of points are used to generate a set of coefficients defining a higher order polynomial correction curve. In yet other embodiments, the calibration correction definitions comprise raw calibration input data (from which calibration equation coefficients are rendered)—rather than the correction equations themselves.

In another exemplary implementation of the invention, correction definitions for a calibrated range are rendered for each of a set of temperatures. The transmitter then uses the calibration data set at the calibration temperature determined to be the most appropriate for a current temperature. To make this relationship more accurate, or to avoid large jumps when switching between two temperature compensation values, an interpolation technique is applied on a real time basis to track temperature changes. By way of example, a weighted average of the slopes and offset values at two calibration data sets on either side of the current temperature are used to define a temperature compensated calibration correction curve. In this implementation, the process variable transmitter calibrations correct for both the range-related and temperature-related effects on calibration accuracy for sensed process variables.

Figure 1:
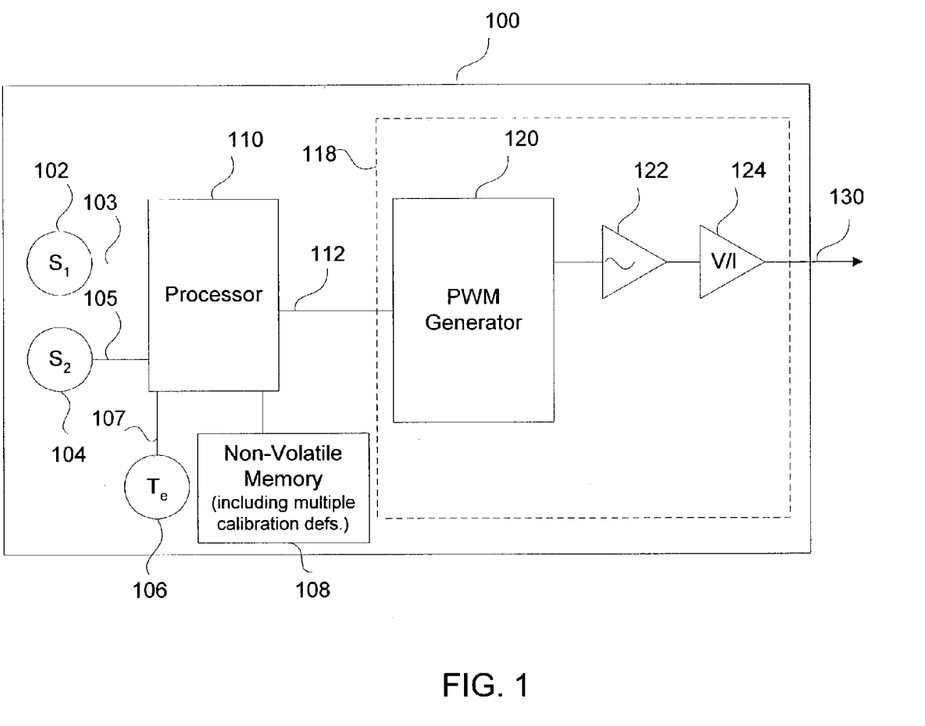
FIG. 1 is a schematic diagram generally illustrating an exemplary process variable transmitter embodying the present invention.

Turning to the drawings, and in particular FIG. 1, the invention is embodied within a process variable transmitter 100. The process variable transmitter 100 includes a first process variable sensor $S_1$ 102, a second process variable sensor $S_2$ 104 and an electronic temperature sensor $T_e$ 106. In the exemplary embodiment, the electronics temperature sensor 106 provides a measure of the ambient temperature in the vicinity of the electronics (as opposed to the process variable sensors 104 and 106) of the process variable transmitter 100. In addition, the transmitter 100 includes a processor 110 having access to a non-volatile memory 108 and inputs for receiving input signals from the sensor 102, 104 and 106. Such input signals include, in various exemplary embodiments of the invention, signals representative of sensed temperature, pressure, pH, etc. process variables of process variable input signal types. As those skilled in the art will appreciate in view of the disclosure herein, the present invention is potentially applicable to a wide variety of process variable transmitter types for sensing and transmitting a signal representative of a sensed physical condition. The operation of the processor 110 is governed by program instructions and data (including calibration correction definitions for multiple calibrated ranges and temperatures) stored in the non-volatile memory 108. It is noted that the non-volatile memory 108 can comprise multiple components including both programmable (e.g., EEPROM) and non-programmable (e.g., read-only memory) components. The programmable data components of the non-volatile memory 108, in particular calibration-related correction equation coefficients, are described further herein below with reference to FIG. 2.

As those skilled in the art will readily appreciate in view of the illustrative embodiments, there are a variety of ways in which to pass the analog signals, corresponding to a sensed physical conditions, from sensors, such as the sensors 102, 104 and 106, to the processor 110. The inputs of the processor 110 coupled to the servers 102, 104 and 106, in the illustrative embodiment of the invention, comprise analog signal inputs. As depicted in FIG. 1, the analog signals on dedicated analog signal lines 103, 105 and 107 are coupled to corresponding analog signal inputs of the processor 110. The signals received by the processor 110 via lines 103, 105 and 107 are passed to one or more analog-to-digital converters incorporated into the processor 110. However, in alternative embodiments of the invention, one or more of the analog signals provided by the sensors 102, 104, and 106 are passed to an external multiplexing circuit that, in turn routes a selected one of the analog signals to an analog input on the processor 110. In yet another embodiment of the invention, the analog signals from the sensors 102, 104 and 106 are routed to an external digital-to-analog converter having a digital output coupled to a digital input of the processor 110. The digital output of the external digital-to-analog converter is read/registered by the processor 110 via a digital input.

The processor 110, in the illustrative embodiment, processes digitized analog input signals from the sensors 102, 104 and 106, according to instructions and data provided by the non-volatile memory 108, to render a digital process variable value. The digital process variable value results from readings of the analog signals provided by one of more of the sensors 102, 104 and 106. The processor 110, either synchronously or asynchronously, issues the digital process variable value via line 112 to an output interface portion 118 of the process variable transmitter 110.

The output interface portion 118 supports communication between the transmitter 100 and other communicatively coupled data acquisition and/or control components. In an embodiment of the invention, the output interface portion 118 comprises a conventional 4 to 20 milliamp interface controlled by a count value submitted via line 112. However, the output interface portion 118, in another embodiment of the invention comprises a digital output that provides digital output on a field bus to which multiple field devices (e.g., process variable transmitter) are communicatively coupled. The present invention is not limited, in its broadest terms, to any particular mode of communication utilized by the process variable transmitter 100 to communicate a process variable value to another component of a process control system.

FIG. 1 depicts an embodiment of the invention wherein the output interface portion 118 provides an analog signal having a magnitude that corresponds to the position of the calculated process variable value in relationship to a currently selected range of values selected for the process variable transmitter. At the lowest value in the selected range, the analog signal on line 130 measures 4 milliamps. At the highest value in the selected range the analog signal on line 130 measures 20 milliamps. In the illustrative embodiment, a trimmed pulse width modulation (PWM) generator 120 receives the digital signal on line 112 (that may comprise one or more physical lines). The PWM output from the generator 120 is sequentially passed through analog conditioning circuitry including a low-pass filter 122 and a voltage to current converter 124 to provide an analog signal on output line 130.

When employed to sense environmental conditions, the transmitter 100 receives sensed condition signals through the sensors 102, 104 and 106 and provides a corresponding calibrated output via line 130, which is interpreted to represent a particular environmental variable value with respect to the sensed condition. In one exemplary process variable transmitter 100, the first process sensor 102 comprises a pressure sensor, the second process sensor 104 comprises a temperature sensor (measuring the temperature in the vicinity of the (pressure) sensor 102), and the corresponding calibrated output on line 112 represents a calibrated measured process pressure. These and other varieties of process variable transmitters are well known in the art. The present invention is, however, applicable to a variety of process variable transmitters that employ a wide variety of process sensors, covering the range of industrial applications.

Figure 2:
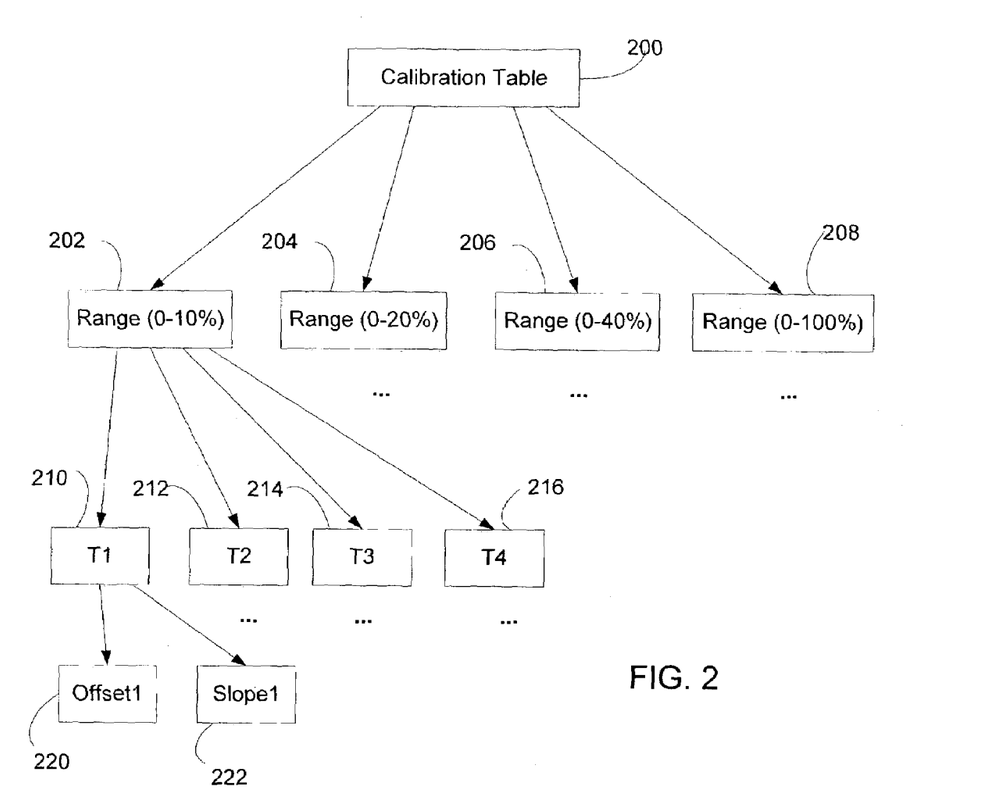
FIG. 2 is a hierarchical tree structure representing an exemplary data relationship for entries in a table storing multiple calibrated ranges in non-volatile memory on the exemplary process variable transmitter.

Turning now to FIG. 2, the present invention embodies concurrently storing calibration information for a variety of ranges within the full range of operation of a process variable transmitter. In accordance with this feature, the process variable transmitter 100 employs the programmable non-volatile memory 108 to maintain a calibration data table (or any other suitable data structure including for example, records, lists, tagged XML data, etc. In an embodiment of the invention, the calibration data is stored/retrieved according to a schema that is depicted by way of example in FIG. 2. The depicted tree structure indicates labeled fields of a calibration correction definition table in a database maintained in the non-volatile memory 108. The exemplary embodiment of the present invention includes both range and temperature keyed calibration definition storage/access. There are a variety of ways to store the calibration data, and such ways are contemplated in alternative embodiments of the invention.

The exemplary calibration data storage schema depicted in FIG. 2 begins, at a highest level, with a calibration root 200. The calibration root 200 corresponds, by way of example to a calibration table address in the non-volatile memory 108. The calibration root 200, in turn, references a set of range-based entries 202, 204, 206 and 208—four ranges are provided under a primary search key in the exemplary calibration table. Each of the range-based entries 202, 204, 206 and 208 is associated (by labeling, tagging, etc.) with a calibration range expressed in terms of a percentage of the full range of the process variable transmitter 100 (e.g., 0–10%, 0–20%, 0–40%, and 0–100%). The range-based entries 202, 204, 206, and 208 are further capable of being more specifically delimited, in the exemplary embodiment, according to a secondary, temperature-based, search key. As such the range-based entries 202, 204, 206 and 208 reference sets of temperature-based sub-entries. Each of the temperature-based sub-entries (e.g., entries 210, 212, 214 and 216 for range-based entry 202), associated with a particular calibration temperature and previously specified range, includes a calibration correction definition at the lowest level of the calibration tree depicted in FIG. 2. In an embodiment of the invention, each leaf of the tree includes an offset node (e.g., offset node 220) and a slope node (e.g., slope node 222). However, alternative embodiments of the invention include calibration definitions stored in different form including, for example, raw calibration data from which an offset and slope are derived. Furthermore, the slope and offset correspond to a first-order/two-point calibration. Alternative, higher-order calibration procedures result in additional calibration equation coefficients corresponding to the higher level coefficients of a calibration correction equation. It is noted that a substantial portion of the sub-nodes in the tree structure depicted in FIG. 2 are not included in the drawing to avoid unduly complicating the tree drawing.

Figure 3:
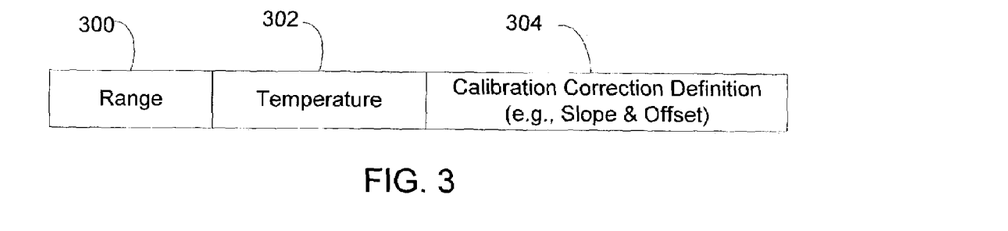
FIG. 3 is an exemplary set of fields associated with a calibration entry within the calibration table stored in non-volatile memory on the exemplary process variable transmitter.

Turning to FIG. 3, an exemplary single table entry, corresponding to a specified range and temperature, is depicted in accordance with an embodiment of the present invention. A range field 300, in an embodiment of the invention, specifies a particular range with which a particular calibration definition is associated. The range field 300, in an embodiment of the invention, corresponds to two points (e.g., the endpoints) at which calibration was performed. In this case, it is up to a designator of a current range of the process variable transmitter to choose an appropriate one of the calibration definitions. Alternatively, the range field 300 stores a range over which the calibration is intended to be used. Next, a temperature field 302 specifies a temperature at which a calibration definition was obtained. A calibration correction definition 304 comprises, in an embodiment of the invention, the coefficients (e.g. slope and offset) of an equation that is used to render a calibrated measurement value from a characterized/uncalibrated measurement value. It is emphasized that the above-described calibration table entry is exemplary, and that a wide variety of calibration data storage arrangements are contemplated in alternative embodiments of the invention.

Figure 4:
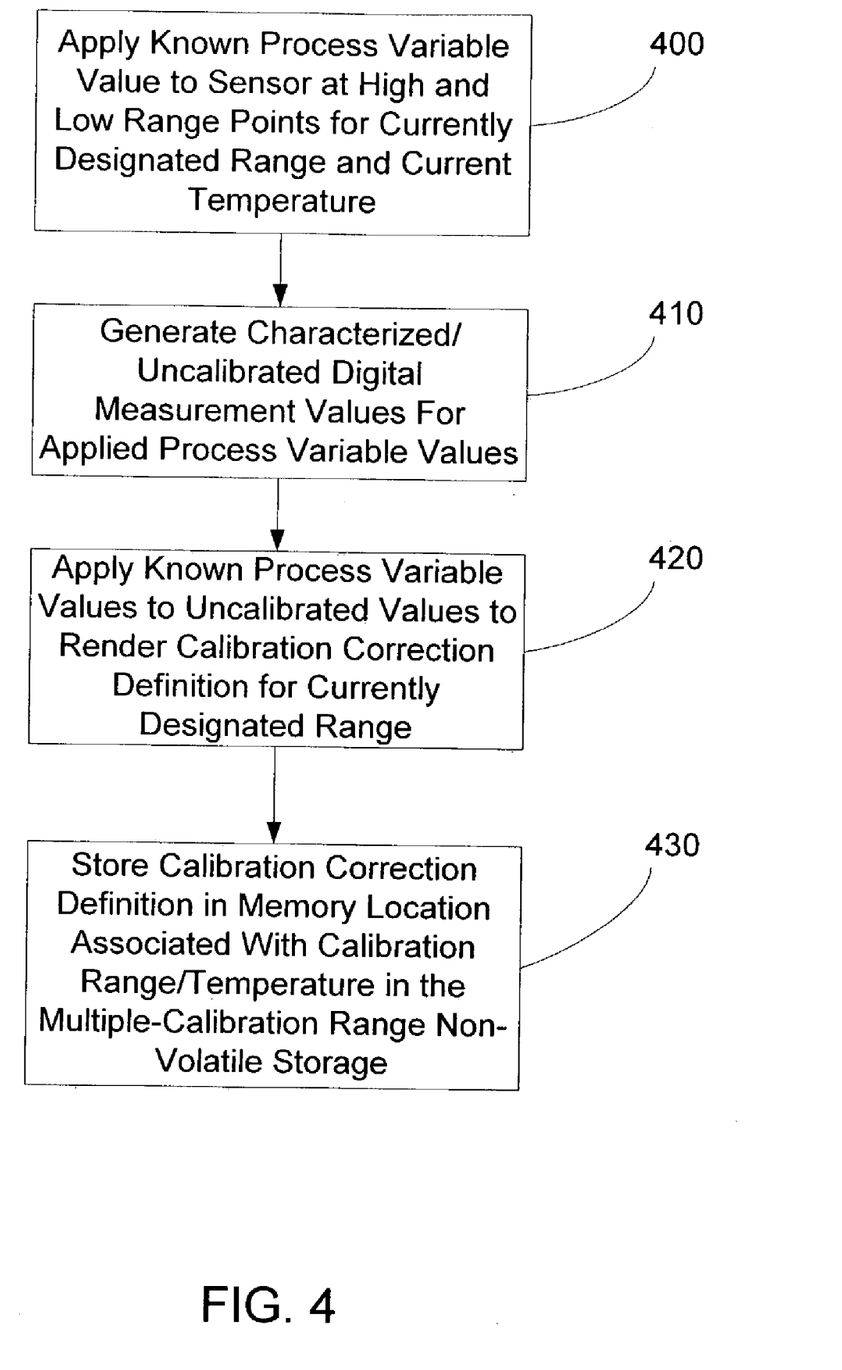
FIG. 4 summarizes an exemplary set of steps associated with setting up calibration correction definition entries for storage in the non-volatile memory of the exemplary process variable transmitter.

Turning to FIG. 4, an exemplary set of steps are depicted for setting up a calibration correction definitions table containing the multiple calibration range correction definitions that are stored within the non-volatile memory 108 and accessed by the processor 110 and its loaded programs to generate calibrated output to the output interface 118 of the process variable transmitter. The steps summarized in FIG. 4 represents a single range calibration at a particular temperature. The steps are repeated as many times as desired to cover a variety of ranges and temperatures. Each iteration of the set of calibration steps results in an additional entry in the calibration table in the non-volatile memory of the process variable transmitter 100.

Initially, during step 400 known high and low range process variable values are applied at a current temperature, and sensor output readings are taken. It is noted that the readings may comprise multiple, averaged readings at each of the applied pressures. Furthermore, while a high and low pressure are taken in the illustrative embodiment, additional readings are taken at intermediate applied known process variable values to enhance the accuracy of the correction definition (curve) in alternative embodiments of the invention.

Next, during step 410 the processor 110 generates characterized, but non-calibrated, digital values corresponding to the process variable measurements taken during step 400. In an embodiment of the invention, characterized digital values are expressed in terms of the full operating range of the process variable transmitter. Thereafter, during step 420 the characterized/uncalibrated values are compared to the known applied values. The differences between the known and calculated process variable values at each of the calibration points are then used to render a calibration correction definition for the calibrated range and temperatures. It is noted that the rendering of the correction definitions can occur at any point after generating the calculated values for known applied pressures. For example, in an embodiment of the invention, during a first calibration stage, the uncalibrated values are calculated for a number of known applied process variable values. At some later time, the correction curves are generated for a number of ranges from the previously registered uncalibrated values and their associated known applied values.

After generating a calibration correction definition, the definitions are stored at particular range and temperature-specified locations during step 430. In an embodiment of the invention, the calibration definitions are stored within a table associated with a rudimentary database. While a variety of storage arrangements are contemplated, embodiments of the invention maintain an association to a context that includes at least the known process variable applied to render the calibration information. The calibration capabilities are further enhanced by including a temperature designation to the context and taking calibration readings at multiple temperatures, and thereafter storing the calibration for each of the temperatures in the non-volatile memory 108.

Figure 5:
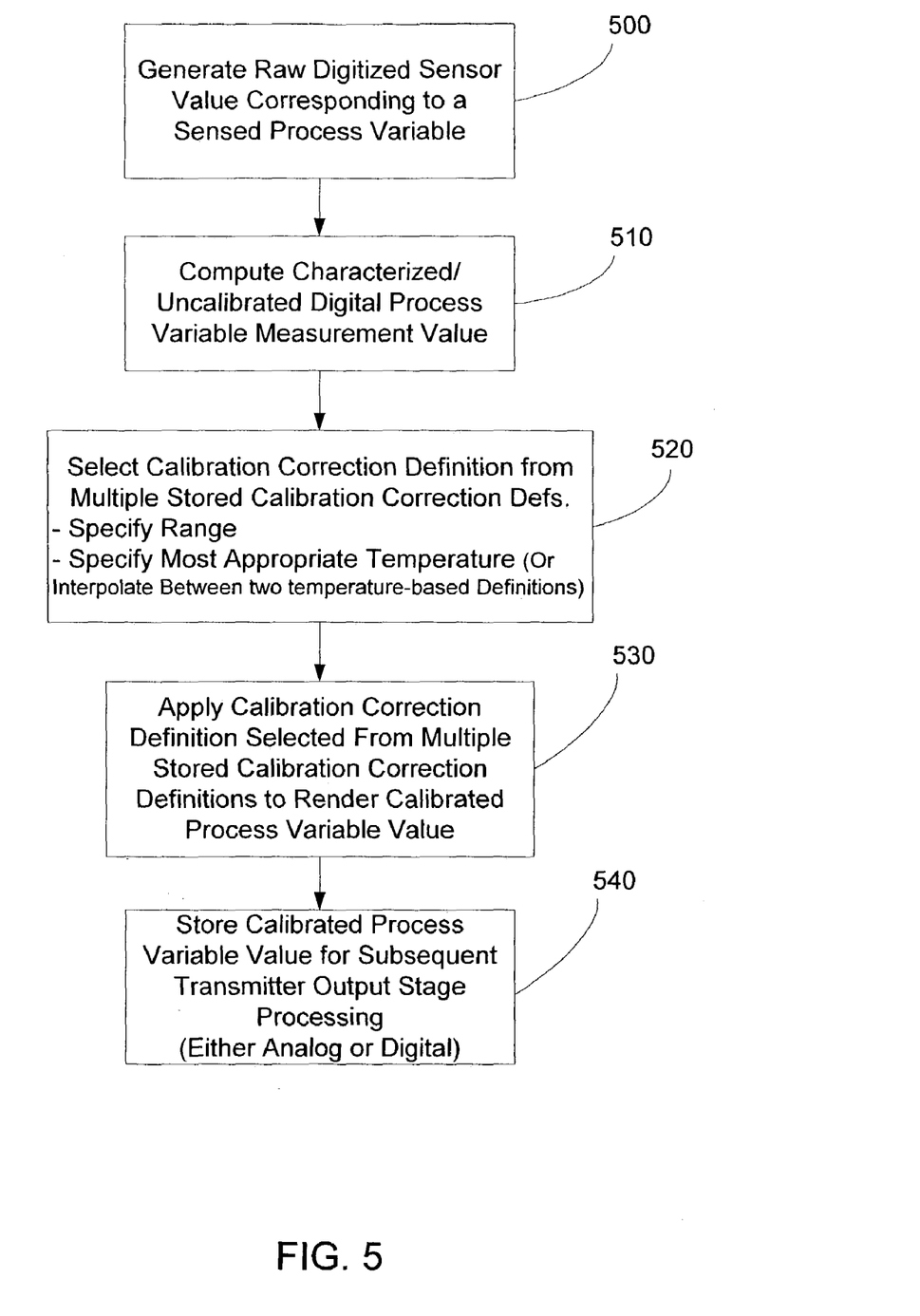
FIG. 5 summarizes an exemplary set of steps associated with generating a calibrated process variable output value based upon a currently selected calibration definition (or interpolated calibration definition) from the multiple calibration definitions maintained in the non-volatile memory of the exemplary process variable transmitter.

Turning now to FIG. 5, a set of steps summarize the general stages for outputting a calibrated process variable value (with emphasis placed on the calibration correction). Initially, during step 520 raw digitized sensor values are read by the processor 110 from one or more process variable sensors. During step 510 the processor applies a characterization equation (often comprising a high-order polynomial) to render, in a known manner, non-calibrated measurement values. During step 520, that may occur at any point before step 530, a calibration correction definition is selected for application to the non-calibrated value rendered during step 510. In an embodiment of the invention, the selected calibration definition is based only on a selected range of operation. In general, a calibration definition that corresponds most closely to a current range of the process variable transmitter 100 is selected. In this case, if the range does not change, then a new range-specific calibration definition need not be selected.

However, in enhanced embodiments, the selection of a particular calibration definition is established on a more dynamic basis by sensing a current temperature proximate the sensor and then selecting a temperature-specific calibration correction definition (or calculating one by interpolating between two adjacent temperature-specific definitions for a selected range based on a current temperature). The above described calibration ranges reduce inaccuracies, but systematic errors introduced by such factors as temperature are not accounted for. Therefore, as explained above, the calibration correction definitions are generated at multiple recorded temperatures, and the results are stored in the memory storage 108. Using a temperature sensor, such as sensor 104, the process transmitter 100 uses a calibration definition generated at a calibration temperature closest to the actual measure temperature, to adjust for temperature-dependent (primarily offset) effects. Performance of this algorithm is further enhanced by using a weighted average of the calibration ranges generated at calibrated temperatures on either side of the actual temperature. Thus, if the temperature is 94 degrees, the calibration definitions generated at 80 degrees and that generated at 100 degrees for a particular selected range are used to derive a weighted average closely approximating the hypothetical calibration data that would be generated at the actual temperature of 94 degrees.

Next, during step 530 the processor 110 applies the selected/interpolated correction definition to the characterized measured value. While not depicted in the flowchart, yet another calibration value (zero offset) is potentially specified during a user-initiated zeroing operation. The zero offset is also applied during step 530. Step 530 thus renders a calibration corrected process variable value. The process variable value is then stored during step 540 for potentially further processing (e.g., averaging, filtering, conversion to an expected output format, etc.) and output via the transmitter output interface 118.

Figure 6:
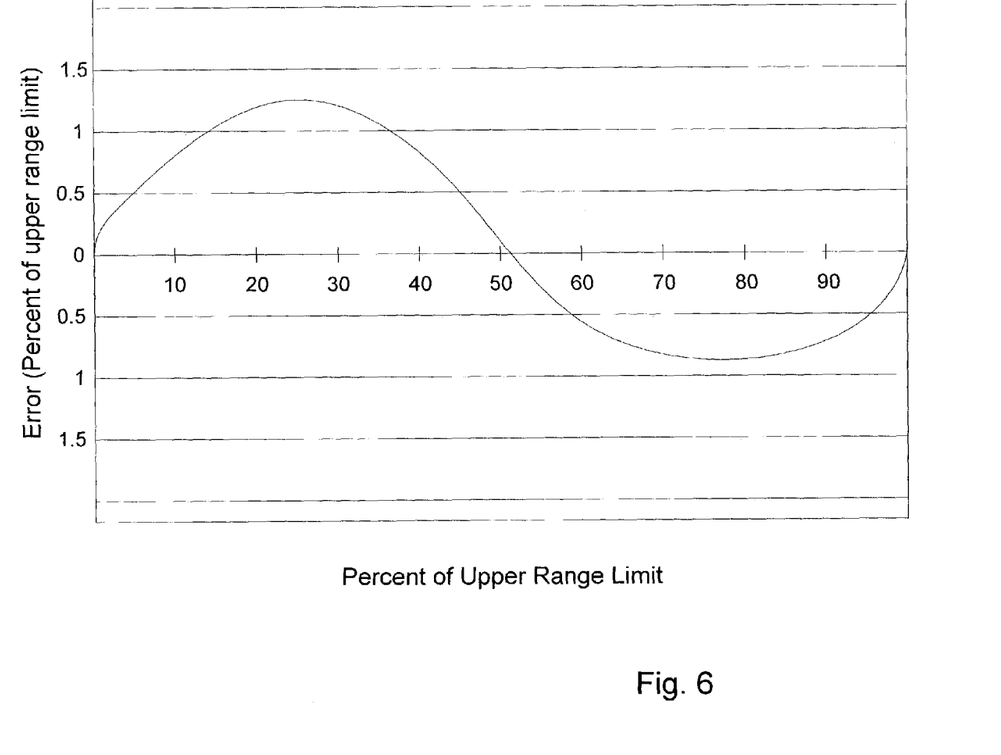
FIG. 6 is a graph presenting an exemplary difference between an output derived from an experimental measurement and the output that would be generated from an ideal measurement, called the error, as a function of the full operating range of a process variable transmitter.

The figures that follow, and their descriptions, are intended to emphasize the advantages exhibited by the present invention. Turning to FIG. 6, a graph is depicted presenting an exemplary difference between an output derived from an experimental measurement and the output that would be generated from an ideal measurement, called the error, as a function of the full operating range of a process variable transmitter 100. In the case in which the process variable transmitter 100 is a pressure transmitter, this graph represents the error between the measured process pressure and the actual process pressure in the system. As shown, along the full operating range of the pressure transmitter, the actual process pressure is under- and over-estimated according to a complex relationship. The relationship between the actual pressure value and the pressure sensor 102 sensed condition signal is often non-linear, giving rise to these inaccuracies. Although the calculated output has been partially corrected for non-linearity and the effects of temperature over its full range these process measurements are not perfect, and therefore residual errors remain along the entire range. If only a portion of the full operating range of the pressure process transmitter is used, errors greater than 1% of the specified operating range of the device might be realized. In many applications, these errors are unacceptable, and must therefore be further minimized.

Figure 7:
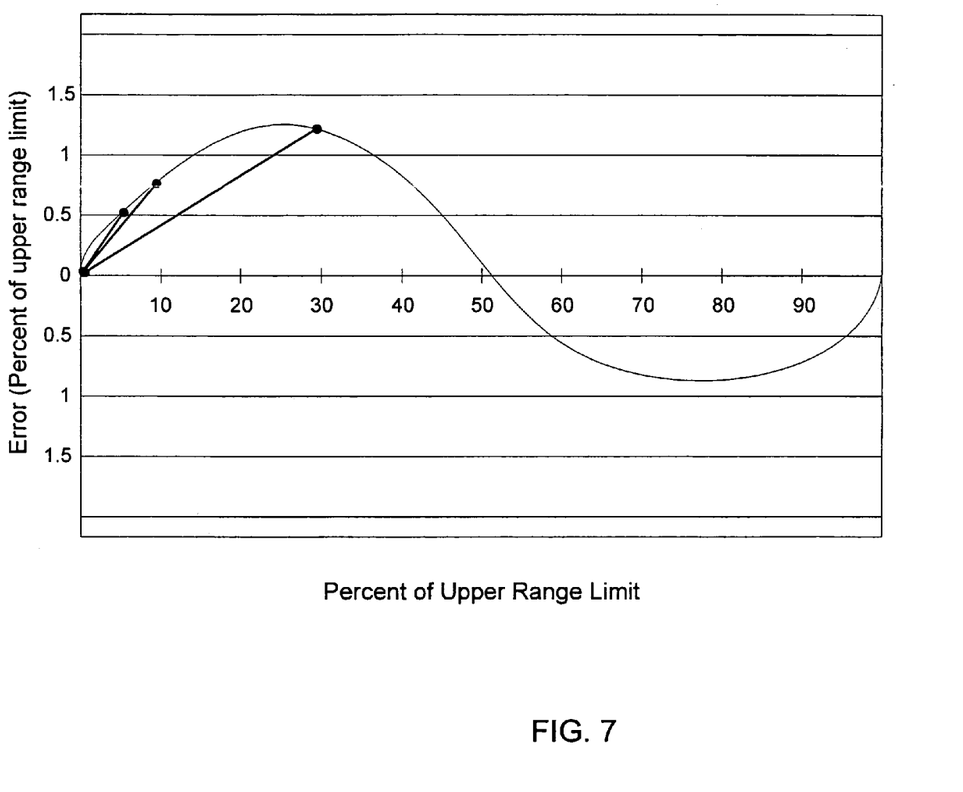
FIG. 7 is a graph illustrating the effect of using multiple calibration ranges to minimize the effective error of a process variable transmitter according to an embodiment of the invention.

The results of minimizing these errors according to one embodiment of the invention are illustrated in the graph in FIG. 7. As shown in FIG. 7, the full operating range of the process transmitter, from 0 to 100% of the upper range limit, is not used for every process measurement. Instead, that range is broken into multiple calibration ranges that use different end points to more carefully tailor the calibration range to the operating range of the transmitter 100. These calibration ranges are represented by dots on the graph separated by straight lines. As shown in the graph, end points of 5, 10 and 30% were chosen to define three calibration ranges that will yield more accurate process measurements within those ranges. So, for example, if a process transmitter is operating in the range from 11–16% of the upper range limit, the user has the ability to use the calibration range from 0 to 30% rather than the original 0 to 100% range. Using the full operating range, the user confronts an error of approximately 1% of the upper range limit. By using the more limited calibration range of 0 to 30%, the maximum calibrated output error becomes approximately 0.5%, a significant improvement from operating the same process transmitter in a different calibration range.

By storing the values defining these calibration ranges in the process transmitter's memory storage 108 rather than calibrating the device for each application, time and money are saved, as only a zero adjustment is performed and applied once the process transmitter 100 has been installed.

There are many alternative means for deriving, calibrating and storing calibration ranges. In one embodiment, the process transmitter 100 is provided with a feature allowing the user to perform the calibrations. For example, if a user has the expensive equipment to make accurate pressure measurements, the reference sensed condition signal corresponding to 30% of the upper range limit pressure of the device can be stored in the memory storage 108. Since it is relatively easy to "zero" pressure process transmitters, the device then has two stored reference points to generate a calibration range including slope and offset of a newly defined relationship between calculated output from the processor 110 and the sensed condition signal from the sensor 102. By giving the user the ability to define unique calibration ranges, the actual operating range that will be encountered by the particular process transmitter 100 can be more closely approximated. A smaller calibration range typically yields a more accurate result.

Most potential users would probably benefit from calibration ranges generated prior to receipt of the process transmitter 100. In order to minimize costs, many process transmitters 100 could be calibrated over multiple, "popular" calibration ranges. In the particular industrial application, the stored calibration definitions are selected to suit the current operating range of the application.

As mentioned above, the particular means of storage is also quite variable. In one embodiment, the slope and offset of the calibration range is stored. In another embodiment, the two points relating the sensed condition signal to the measured process value are stored. As long as a correction relation can be defined by the stored information, the calibration range can later be utilized.

Figure 8:
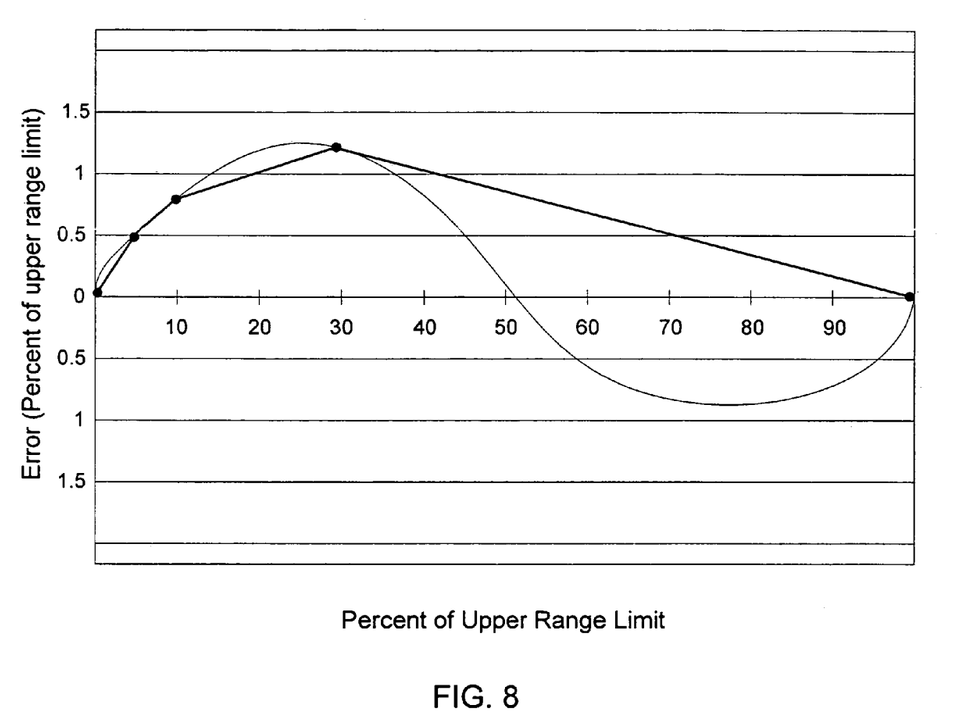
FIG. 8 is a graph illustrating the effect of using multiple consecutive (sequentially accessed) calibration ranges to minimize the effective error of a process variable transmitter according to an embodiment of the invention.

In general, as the calibration range of the process transmitter 100 becomes smaller, the absolute accuracy of the device increases, since except in rare circumstances shorter segments of a curve are more linear. In FIG. 8, one embodiment of the invention takes advantage of this fact to yield more accurate process results. Rather than defining calibration ranges from zero to some varying percentage of the upper range limit, the calibration range is defined from any point along the full operating range to any other point, often in a consecutive fashion. Thus, the multiple calibration ranges shown in FIG. 8 are 0 to 5%, 5 to 10%, 10 to 30% and 30 to 100%. In at least the first three calibration ranges, these calibration ranges minimize errors more effectively than the single range system shown in FIG. 6, and even more effectively than the calibration ranges described with respect to FIG. 7. Furthermore, the calibration definitions can be switched dynamically during operation of a transmitter as the sensed pressure passes into a different range in the set of calibrated ranges represented in FIG. 8. In this case the stored slopes and offsets for each range are calculated so as to equate to the end points of the adjacent ranges, thus eliminating discontinuities between calibrated ranges.

It is envisioned that performing the calibration procedures as part of the manufacturing stage to render the multiple calibrated ranges will enable users to forego field calibration of the transmitters. A transmitter's calibration corrections are carried out according to the factory-installed calibration correction definitions. However, some users desire at least the capability to perform the calibration of their transmitters (with the opportunity to use, if needed, the factory-provided defaults). Thus, in accordance with an embodiment of the present invention, the transmitter includes at least two calibration tables that facilitate providing two distinct sets of calibration correction definition entities. The first calibration table is filled with calibration correction definition entries entered by a manufacturer/supplier. The second calibration correction table is specified, at least in part, by the user/installer of the transmitter.

The first set of calibration correction definition entries is provided by the manufacturer. The first set is treated as a default/read-only set that cannot be overwritten. The default set is established, for example, during factory calibration (when the sensor is characterized and the transmitter calibration temperature response is determined/characterized). In an exemplary embodiment, a transmitter is calibrated at five different process variable input values (e.g., pressures) for each of five different temperatures.

The second set of calibration correction definition entries, though initially specifying a copy of the factory default calibration values (stored in the first set of calibration correction definition entries), can be overwritten/displaced/replaced by a user in accordance with the user's own calibration procedures/specifications. For example, a user operating the transmitter in a range that does not closely coincide with the factory-supplied calibration points may seek to calibrate the transmitter at points that coincide with the transmitters intended operating range. In such case, the user is permitted to enter multiple calibration range correction definitions that are thereafter used to populate/configure the second calibration correction definition table.

The degree to which a user performs their own calibration (supplying multiple points at multiple temperatures) varies in accordance with various embodiments of the invention. In an embodiment of the invention, the second set of calibration correction definition entries is specified without any contribution from the first set of calibration correction definition entries. However, in other embodiments of the invention, the first set of calibration correction definition entries facilitates completing the second set of calibration correction definition entries based upon a sub-set of calibration points supplied by a user for the second set of calibration corrections.

In a particular embodiment of the above-described transmitter containing first and second calibration correction definitions, a transmitter integrates user-entered calibration points (as little as a single calibration point at a single temperature) and factory provided calibration points (stored in the first table) to render a full calibration definition. The full calibration definition includes, for example, sufficient calibration information to cover the full environmental temperature and process variable input ranges of the transmitter. Once a user has provided an initial set of calibration correction points for the transmitter, the remaining calibration points are determined based upon: the user provided calibration points and the calibration points (and temperature response) provided within the first (e.g., factory-supplied) set of calibration correction definition entries.

Figure 9:
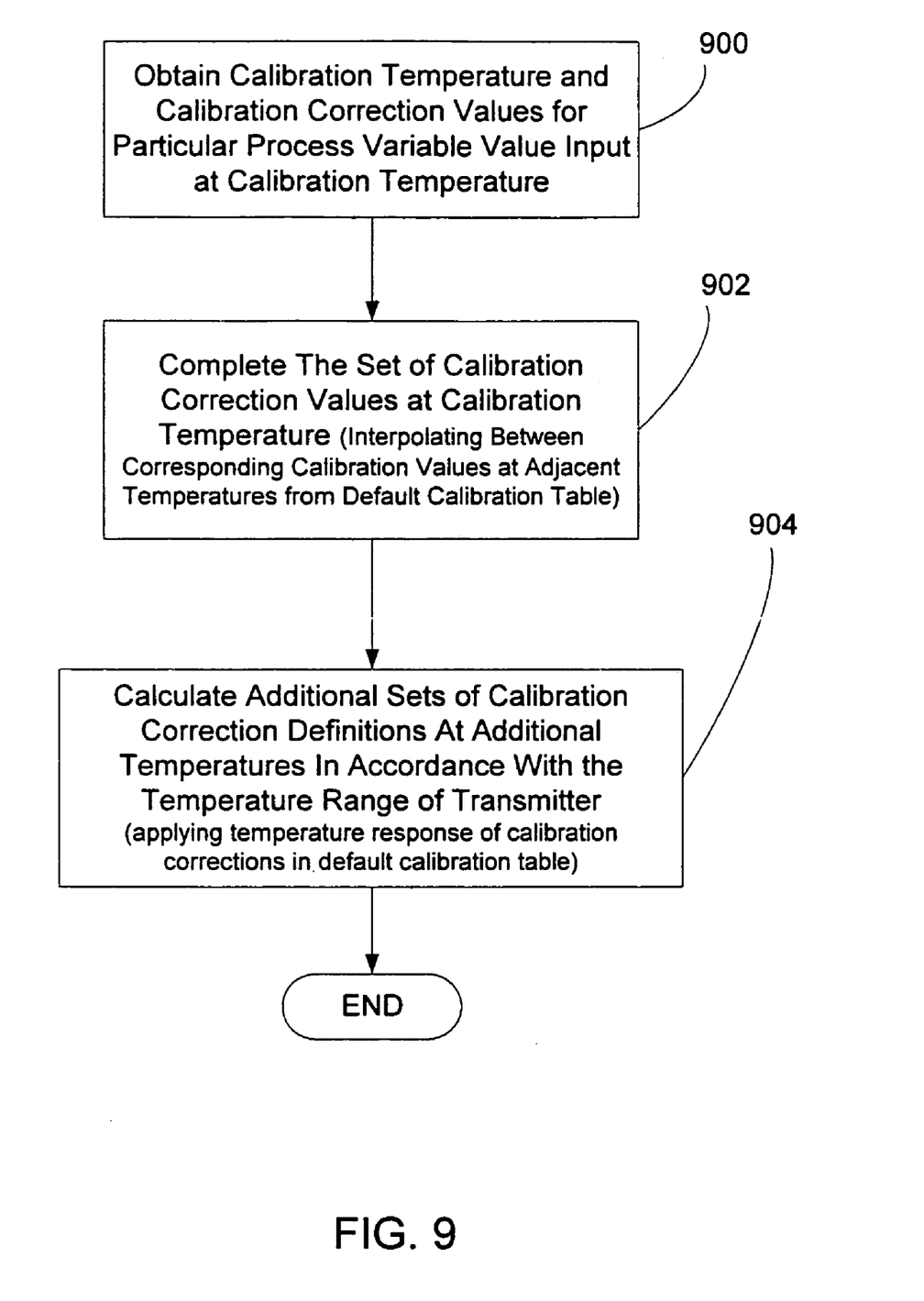
FIG. 9 is a flowchart depicting steps for generating a calibration table derived at least in part from user-specified calibration correction values.

By way of example, and with reference to FIG. 9, an exemplary set of steps are provided wherein a user calibrates the above-described process variable transmitter including first and second calibration correction definition tables. In a typical case, the user calibrates the transmitter at a local ambient temperature, which is not necessarily at the expected operating temperature of the transmitter (which, in any event is likely to vary over the course of the transmitter's operation). Calibration values for other temperatures are calculated from a temperature response of the transmitter obtained from an analysis of the calibration information within the first calibration correction definition table.

Initially, during step 900, the calibration temperature and a set of calibration correction values (at the calibration temperature) are obtained by the user. For example, the user applies a high pressure value and low pressure value to a pressure transmitter at room temperature (70 degrees Fahrenheit).

Next, at step 902, the transmitter calibration logic calculates additional calibration points at the user's calibration temperature to complete the set of calibration points for the transmitter at that temperature. In an embodiment of the invention, the transmitter calibration logic at each additional calibration point interpolates between the correction values provided by the first (default) table at adjacent temperature points. For example, a calibration point at 20 pounds per square inch at 70 degrees Fahrenheit is determined by interpolating between the factory-supplied correction values at 20 psi. in the 50 and 100 degree Fahrenheit correction definitions stored in the first table. Upon completing step 902, a calibration correction definition is provided for the full range of the transmitter at the user's calibration temperature.

Thereafter, at step 904, calibration correction sets are calculated (without taking additional readings at different temperatures), for the second table, at other temperatures to cover a range of transmitter temperatures similar to the first table. The temperature response of the transmitter embodied in the first table is used to calculate (translate) and store calibration correction sets for the transmitter at the various other temperatures within the operating temperature range of the transmitter. The resulting second calibration table, designated in part by the user, includes all the temperature and range-specific calibration correction advantages embodied in the first (factory-supplied) table of calibration correction values. Finally, it is noted that in addition to aiding in completing the user-specified (second) calibration table, the values from the default (first) calibration table, in an embodiment of the invention, are used to verify the accuracy of user-specified calibration correction values. In the case where an entered calibration correction value deviates substantially from a value provided by the default calibration table, then a warming is raised.

In view of the many possible embodiments to which the principles of this invention may be applied, it should be recognized that the embodiments described herein with respect to the drawing figures are meant to be illustrative only and should not be taken as limiting the scope of invention. Furthermore, the illustrative steps may be modified, supplemented and/or reordered without deviating from the invention. Therefore, the invention as described herein contemplates all such embodiments as may come within the scope of the following claims and equivalents thereof.

What is claimed is:

1. A process variable transmitter comprising:
    a process variable sensor;
    a processing unit, adapted to receive a value corresponding to a signal received from the process variable sensor, the processing unit including output value computation stages for rendering a calibrated output value based upon the received value including:
        a characterization computation stage, and
        a calibration computation stage; and
    a calibration memory comprising multiple calibration correction definition entries expressing a correction relation for generating calibration corrections for multiple calibrated ranges within a full operating range of the process variable transmitter;
    wherein a calibration correction definition entry corresponds to a pair of calibration points delimiting one of the multiple calibrated ranges and includes a slope and offset value for a linear correction equation associated with one of the multiple calibrated ranges.

2. The process variable transmitter of claim 1 wherein the correction definition is specified, at least in part, as a percentage of a specified upper range limit for the process variable transmitter.

3. The process of claim 1 wherein the characterization computation stage and calibration computation stage are distinct stages.

4. A process variable transmitter comprising:
    a process variable sensor;
    a processing unit, adapted to receive a value corresponding to a signal received from the process variable sensor, the processing unit including output value computation stages for rendering a calibrated output value based upon the received value including:
        a characterization computation stage, and
        a calibration computation stage; and
    a calibration memory comprising multiple calibration correction definition entries expressing a correction relation for generating calibration corrections for multiple calibrated ranges within a full operating range of the process variable transmitter;
    wherein a calibration correction definition entry corresponds to a pair of calibration points delimiting one of the multiple calibrated ranges and corresponds to a sensor vicinity temperature at which calibration information was obtained for the calibration correction definition entry.

5. The process variable transmitter of claim 4 wherein the calibration computation stage applies a calibration correction equation based upon at least one calibration correction definition entry selected according to a sensor vicinity temperature.

6. The process variable transmitter of claim 5 wherein the calibration correction equation is derived from two calibration correction definitions associated with two differing sensor vicinity temperatures.

7. A process variable transmitter comprising:
    a process variable sensor;
    a processing unit, adapted to receive a value corresponding to a signal received from the process variable sensor, the processing unit including output value computation stages for rendering a calibrated output value based upon the received value including:
        a characterization computation stage, and
        a calibration computation stage; and
    a calibration memory comprising multiple calibration correction definition entries expressing a correction relation for generating calibration corrections for multiple calibrated ranges within a full operating range of the process variable transmitter;
    wherein a set of calibration relations are specified for a series of adjacent ranges, and wherein calibration values are generated such that calibrated output values are equal at boundaries between adjacent calibrated ranges.

8. The process variable transmitter of claim 7 wherein a calibration correction definition entry corresponds to a pair of calibration points delimiting one of the multiple calibrated ranges.

9. The process variable transmitter of claim 7 wherein a calibration correction definition entry specifies a higher order correction curve for a calibrated range.

10. The process variable transmitter of claim 7 wherein the ranges are specified as a percentage of a specified upper range limit for the process variable transmitter.

11. The process variable transmitter of claim 7 wherein the processing unit dynamically changes between ones of the set of calibration relations in accordance with changes to a sensed process variable input value.

12. A process variable transmitter comprising:
    a process variable sensor;
    a processing unit, adapted to receive a value corresponding to a signal received from the process variable sensor, the processing unit including output value computation stages for rendering a calibrated output value based upon the received value including:
        a characterization computation stage, and
        a calibration computation stage; and
    a calibration memory comprising multiple calibration correction definition entries expressing a correction relation for generating calibration corrections for multiple calibrated ranges within a full operating range of the process variable transmitter;
    wherein the calibration memory comprises a first calibration table comprising a default set of calibration correction definition entries and a second calibration table comprising a user-specified set of calibration correction definition entries.

13. The process variable transmitter of claim 12 wherein the user-specified set of calibration correction definition entries is generated by a combination of user calibration points and calibration points provided by the first calibrated table.

14. A method of enabling a process variable transmitter to apply calibration-based corrections to calculated sensor measurements in the process variable transmitter including a non-volatile memory configured to store multiple calibration-based correction definitions corresponding to sub-ranges within a full operating range of the process variable transmitter, the method comprising for each of at least two calibrated ranges the following:
  taking sensor readings for at least two known process variable inputs corresponding to a calibrated range;
  generating, for the two known process variable inputs, digital non-calibrated sensor reading values;
  applying values of the two known process variable inputs to the non-calibrated sensor reading values to render a calibration correction definition; and
  storing the calibration correction definition in an entry, of a calibration memory structure supporting simultaneously storing multiple calibration correction definitions associated with particular calibrated ranges, corresponding to the calibrated range within the non-volatile memory;
  wherein the calibration correction definition corresponds to a pair of calibration points for a calibrated range, the calibration definition comprises a linear correction equation, and wherein the applying step comprises:
    determining a calibration offset and a calibration slope for the calibration correction definition.

15. The method of claim 14 wherein the calibration correction definition is specified, at least in part, as a percentage of a specified upper range limit for the process variable transmitter.

16. A method of enabling a process variable transmitter to apply calibration-based corrections to calculated sensor measurements in the process variable transmitter including a non-volatile memory configured to store multiple calibration-based correction definitions corresponding to sub-ranges within a full operating range of the process variable transmitter, the method comprising for each of at least two calibrated ranges the following:
  taking sensor readings for at least two known process variable inputs corresponding to a calibrated range;
  generating, for the two known process variable inputs, digital non-calibrated sensor reading values;
  applying values of the two known process variable inputs to the non-calibrated sensor reading values to render a calibration correction definition; and
  storing the calibration correction definition in an entry, of a calibration memory structure supporting simultaneously storing multiple calibration correction definitions associated with particular calibrated ranges, corresponding to the calibrated range within the non-volatile memory;
  wherein the calibration correction definition corresponds to a pair of calibration points for a calibrated range and the calibration correction definition further corresponds to a sensor vicinity temperature at which calibration information was obtained for the calibration correction definition.

17. The method of claim 16 further comprising generating calibration corrections for at least two temperatures for a calibrated range to facilitate applying a calibration correction equation based upon at least one calibration correction definition entry selected according to a sensor vicinity temperature.

18. A method of enabling a process variable transmitter to apply calibration-based corrections to calculated sensor measurements in the process variable transmitter including a non-volatile memory configured to store multiple calibration-based correction definitions corresponding to sub-ranges within a full operating range of the process variable transmitter, the method comprising for each of at least two calibrated ranges the following:
  taking sensor readings for at least two known process variable inputs corresponding to a calibrated range;
  generating, for the two known process variable inputs, digital non-calibrated sensor reading values;
  applying values of the two known process variable inputs to the non-calibrated sensor reading values to render a calibration correction definition; and
  storing the calibration correction definition in an entry, of a calibration memory structure supporting simultaneously storing multiple calibration correction definitions associated with particular calibrated ranges, corresponding to the calibrated range within the non-volatile memory;
  wherein the at least two calibrated ranges comprise a series of adjacent ranges, and wherein calibration correction definition values are generated such that calibrated output values are equal at boundaries between adjacent calibrated ranges.

19. The method of claim 18 wherein the calibration correction definition corresponds to a pair of calibration points for a calibrated range.

20. The method of claim 18 wherein the taking sensor readings step comprises taking readings for at least three distinct known process variable inputs, and wherein the calibration correction definition specifies a non-linear correction curve for a calibrated range.

21. The method of claim 18 wherein the ranges are specified as a percentage of a specified upper range limit for the process variable transmitter.

* * * * *